(12) United States Patent
Seidel et al.

(10) Patent No.: US 8,703,869 B2
(45) Date of Patent: Apr. 22, 2014

(54) IMPACT-MODIFIED POLYCARBONATE COMPOSITIONS FOR THE PRODUCTION OF METALLISED MOULDINGS WITH HOMOGENEOUS SURFACE GLOSS

(75) Inventors: Andreas Seidel, Dormagen (DE); Eckhard Wenz, Köln (DE); Hans-Jürgen Klankers, Langenfeld (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 12/729,815

(22) Filed: Mar. 23, 2010

(65) Prior Publication Data

US 2010/0267889 A1 Oct. 21, 2010

(30) Foreign Application Priority Data

Mar. 26, 2009 (DE) .......................... 10 2009 015 039

(51) Int. Cl.
*C08G 63/48* (2006.01)
(52) U.S. Cl.
USPC .................... 525/67; 525/63; 525/64; 525/79; 525/468
(58) Field of Classification Search
USPC .................................. 525/63, 64, 67, 79, 468
See application file for complete search history.

(56) References Cited

U.S. PATENT DOCUMENTS

| | | | |
|---|---|---|---|
| 3,419,634 A | 12/1968 | Vaughn et al. | |
| 3,553,167 A | 1/1971 | Schnell et al. | |
| 3,644,574 A | 2/1972 | Jackson et al. | |
| 4,097,446 A | 6/1978 | Abolins et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,812,515 A | 3/1989 | Kress et al. | |
| 4,859,740 A | 8/1989 | Damrath et al. | |
| 4,861,831 A | 8/1989 | Damrath et al. | |
| 4,937,285 A | 6/1990 | Wittmann et al. | |
| 2003/0191250 A1* | 10/2003 | Seidel et al. | 525/538 |
| 2004/0220276 A1* | 11/2004 | Cousin et al. | 514/649 |
| 2006/0217496 A1 | 9/2006 | Miura | |
| 2011/0042448 A1* | 2/2011 | Nickel et al. | 229/71 |

FOREIGN PATENT DOCUMENTS

| | | | | |
|---|---|---|---|---|
| DE | 2 035 390 | 1/1971 | | |
| DE | 1 495 626 | 6/1971 | | |
| DE | 2 248 242 | 4/1973 | | |
| DE | 27 14 544 | 10/1977 | | |
| DE | 2 842 005 | 4/1980 | | |
| DE | 30 00 610 | 7/1980 | | |
| DE | 29 40 024 | 4/1981 | | |
| DE | 3007934 | 9/1981 | | |
| DE | 3334782 | 10/1984 | | |
| DE | 36 31 540 | 3/1988 | | |
| DE | 36 34 539 | 3/1988 | | |
| DE | 37 04 655 | 8/1988 | | |
| DE | 37 04 657 | 8/1988 | | |
| DE | 3832396 | 2/1990 | | |
| DE | 44 04 604 | 8/1995 | | |
| EP | 0 509 506 | * 4/1992 | ............... | C07F 9/12 |
| EP | 0606558 | 7/1994 | | |
| EP | 0704488 | 4/1996 | | |
| GB | 1397219 | 6/1975 | | |
| GB | 1 409 275 | 10/1975 | | |
| JP | 10287802 | 10/1998 | | |
| JP | 11-60930 | 3/1999 | | |
| JP | 2002 124109 | 4/2002 | | |
| JP | 2002/124109 | 4/2002 | | |
| JP | 2002-124109 | * 4/2002 | ............... | F21S 8/10 |
| JP | 2005-119239 | 5/2005 | | |

OTHER PUBLICATIONS

Balabanovich, A.I.; J. Anal. Appl. Pyrolysis, 2004, p. 229-233.*
Mondo, Technical Bulletin 1301: Talc in Plastics, 2012, p. 1-8.*
International Search Report and Written Opinion based on PCT/EP2010/001641 dated Jun. 4, 2010.
International Preliminary Report and Written Opinion Dated Oct. 6, 2011.

* cited by examiner

*Primary Examiner* — Robert Jones, Jr.
(74) *Attorney, Agent, or Firm* — Miles & Stockbridge PC

(57) ABSTRACT

The invention relates to impact-modified polycarbonate compositions which are distinguished by high heat resistance and good melt flow behavior. In addition, the moldings produced from the compositions according to the invention in an injection-molding process can be metallised, the resulting metallised moldings having a surface with a particularly high and, in particular, homogeneous gloss. The invention thus also provides the metallised moldings produced from the compositions according to the invention.

19 Claims, No Drawings

IMPACT-MODIFIED POLYCARBONATE COMPOSITIONS FOR THE PRODUCTION OF METALLISED MOULDINGS WITH HOMOGENEOUS SURFACE GLOSS

CROSS REFERENCE TO RELATED APPLICATION

This application claims priority to DE 10 2009 015 039 filed Mar. 26, 2009, the content of which is incorporated herein by reference in its entirety.

BACKGROUND OF THE INVENTION

1. Field of the Invention

The invention relates to impact-modified polycarbonate compositions which are distinguished by high heat resistance and good melt flow behaviour. In addition, the mouldings produced from the compositions according to the invention in an injection-moulding process can be metallised, the resulting metallised mouldings having a particularly high and, in particular, homogeneous gloss. The invention thus also provides the metallised mouldings produced from the compositions according to the invention.

2. Description of Related Art

In particular, the invention relates to housings mirror-coated by metallising and thus functioning as reflectors for car headlights and car rear lights, which are made from the polycarbonate compositions according to the invention, have adequate heat resistance and mechanical load-bearing capacity for the application and can be welded to a lamp cover consisting of a transparent polycarbonate or polymethyl methacrylate composition.

The use of polycarbonate compositions for the production of car lights is known in principle.

JP-A 2005119239 discloses a method for the laser welding of car light parts made of thermoplastic resins, wherein the first component is transparent and the second component is opaque. As examples, polycarbonate is disclosed as the transparent component and ABS as the opaque component.

DE-A 440-4604 discloses reflectors, particularly for car headlights, consisting of a rigid shell made of a thermoset material coated with a metallised film of a thermoplastic, wherein the thermoplastic is, for example, a polycarbonate or an ABS.

JP-A 3880142 discloses polycarbonate compositions with pearly gloss and high reflectivity, comprising 35 to 65 wt. % aromatic polycarbonate having a viscosity average molecular weight of 16,000 to 26,000, and methyl methacrylate polymer and acrylic elastomer in a weight ratio of 95:5 to 60:40, and the use of such compositions for the production of lamp reflectors.

JP-A 2002124109 discloses housing materials for car lights which are vapour-coated with a reflector layer made of aluminium, comprising 10 to 90 wt. % polycarbonate and 10 to 90 wt % rubber-modified styrene resin, wherein the materials have a rubber content of 1 to 7 wt. %. No mention is made in this application of any advantages that may arise from a special size of the rubber particles in the rubber-modified styrene resin. The rubber-modified styrene resin used in the disclosed examples is an ABS consisting of 50 parts by weight of butadiene, 15 parts by weight of acrylonitrile and 35 parts by weight of styrene with a particle size of the rubber backbone of 350 nm.

JP-A 10287802 discloses polycarbonate compositions and their use as a housing material for car lights with good heat resistance, solvent resistance, weathering resistance, weldability and metallisability, comprising 30 to 65 parts by weight of aromatic polycarbonate, 5 to 40 parts by weight of graft polymers produced by grafting aromatic vinyl monomers and vinyl cyanides on to acrylate-comprising rubbers, and 20 to 50 parts by weight of copolymers of vinyl monomers and vinyl cyanides.

It is also described in the literature that technical advantages may be obtained from special particle size distributions of the rubber particles in rubber-modified polycarbonate compositions.

EP-A 704 488 discloses polycarbonate compositions with improved low-temperature resistance comprising 15 to 80 parts by weight of thermoplastic polycarbonate, 4 to 40 parts by weight of graft polymer based on rubber particles as the backbone and 16 to 45 parts by weight of thermoplastic vinyl aromatic (co)polymer, wherein the backbone has an average particle size (d50) of 200 to 350 nm and graft polymer and vinyl aromatic (co)polymer are used in a weight ratio of between 2:1 and 1:4.

EP-A 606 558 discloses polycarbonate compositions with improved melt flow behaviour and increased modulus of elasticity in bending, comprising 55 to 90 wt. % of aromatic polycarbonate, 10 to 30 wt. % of a graft polymer based on a particulate diene rubber backbone and 0 to 15 wt. % of a vinyl aromatic copolymer, wherein the diene rubber backbone has a narrow, monodisperse particle size distribution, characterised in that more than 50 wt. % of the particles have a diameter of between 200 and 300 nm and more than 70 wt. % of the particles have a diameter of between 200 and 400 nm.

SUMMARY OF THE INVENTION

The invention is based on the object of providing polycarbonate compositions having high heat resistance and good melt flow behaviour for the production of mouldings in an injection-moulding process, which have a surface with high and homogeneous gloss after metallising. In addition, it was an object of the invention to provide metallised mouldings, and in a preferred embodiment mouldings with a surface which is at least partly curved concavely or convexly on the metallised side, which have a high and, in particular, homogeneous surface gloss and are distinguished by high heat resistance and toughness and can be welded to polycarbonate and/or polymethyl methacrylate.

Surprisingly, it has now been found that compositions comprising

A) 55 to 90 parts by weight, preferably 63 to 80 parts by weight and particularly preferably 65 to 75 parts by weight (based on the sum of the parts by weight of components A, B and C) of aromatic polycarbonate and/or aromatic polyester carbonate, each having a relative solution viscosity, measured in methylene chloride, of 1.20 to 1.30, preferably of 1.22 to 1.28 and particularly preferably of 1.23 to 1.27, B) 10 to 45 parts by weight, preferably 15 to 37 parts by weight and particularly preferably 20 to 34.9 parts by weight (based on the sum of the parts by weight of components A. B and C) of rubber-modified component comprising B.1) at least one graft polymer produced by emulsion polymerisation, by graft polymerisation of B.1.1) 5 to 95 wt. %, preferably 20 to 80 wt. % and particularly preferably 25 to 60 wt. %, based on the sum of B.1.1 and B.1.2, of at least one vinyl monomer on B.1.2) 95 to 5 wt. %, preferably 80 to 20 wt.% and particularly preferably 75 to 40 wt. %, based on the sum of B.1.1 and B.1.2, of one or more particulate rubbers as backbones having lass transition temperatures of <0° C., preferably <−10'C and particularly preferably <−20° C., B.2) optionally a rubber-free vinyl (co)polymer, B.3) optionally a graft polymer of at least one vinyl monomer on at least one rubber backbone having a glass transition temperature of <0° C., preferably <−20° C., produced by a bulk, solution or bulk-suspension polymerisation process, wherein the graft polymers B.1 and B.3, in addition to graft particles, may optionally also comprise as a result of their production free (co)polymer of the vinyl monomers, i.e. not chemically bonded to the rubber particles and/or included in the graft particles in a form that is insoluble in organic solvents, C) 0 to 25 parts by weight, preferably 0 to 10 parts by weight and particularly preferably from 0.1 to 5 parts by weight (based on the sum of the parts by weight of components A, B and C) of polymer additives, characterised in that (i) the rubber content of the polycarbonate composition is 1 to 6 wt. %, preferably 2.0 to 5.5 wt. % and particularly preferably 2.5 to 5.0 wt. % and (ii) at least 40 wt. % and preferably at least 50 wt. % of the graft particles in component B have a diameter (measured by ultracentrifuge) of up to 200 nm, and (iii) in a preferred embodiment, in addition up to 25 wt. %, in particular up to 20 wt. % of the graft particles in component B have a diameter (measured by ultracentrifuge) of more than 400 nm, wherein the sum of the components A+B+C is standardised to 100 parts by weight, achieve the object according to the invention.

DETAILED DESCRIPTION OF A PREFERRED EMBODIMENT

In this application, the term graft particles is understood to mean the portions of the components B.1 and B.3 which are not soluble in suitable solvents such as e.g. acetone or toluene. In each case, these include the rubber backbone with vinyl (co)polymer chemically bonded to the rubber by graft polymerisation as a shell and optionally vinyl (co)polymer irreversibly included in the rubber backbone.

The glass transition temperature in this invention is determined by dynamic differential calorimetry (DSC) according to DIN EN 61006 under Nitrogen with a heating rate of 10 K/min and determination of $T_g$ as midpoint temperature (Mittelpunkttemperatur) by tangent method (Tangentenmethode).

In a preferred embodiment the polycarbonate compositions according to the invention have a melt viscosity, measured in accordance with ISO 11443 at a temperature of 260° C. and a shear rate of 1000 $s^1$, of no more than 240 Pas, preferably no more than 230 Pas and particularly preferably no more than 200 Pas.

Component A

Aromatic polycarbonates according to component A that are suitable according to the invention are known from the literature or can be produced by methods that are known from the literature (for the production of aromatic polycarbonates, cf. for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates, e.g. DE-A 3 077 934).

The production of aromatic polycarbonates takes place e.g. by reacting diphenols with carboxylic acid halides, preferably phosgene, and/or with aromatic dicarboxylic acid dihalides, preferably benzenedicarboxylic acid dihalides, by the interfacial polycondensation process, optionally using chain terminators, e.g. monophenols, and optionally using trifunctional or more than trifunctional branching agents, e.g. triphenols or tetraphenols. Production is also possible by means of a melt polymerisation process by reacting diphenols with, for example, diphenyl carbonate.

Diphenols for the production of the aromatic polycarbonates and/or aromatic polyester carbonates are preferably those of formula (I)

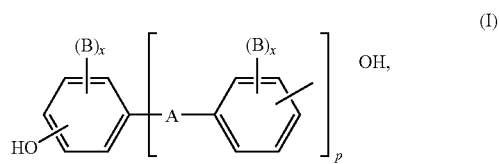

wherein

A is a single bond, $C_1$ to $C_5$ alkylene, $C_1$ to $C_5$ alkylidene, $C_5$ to $C_o$ cycloalkylidene, —O—, —SO—, —CO—, —S—, —SO$_2$—, $C_o$ to $C_{1-2}$ arylene, on to which other aromatic rings, optionally comprising hetero atoms, may be condensed, or a residue of formula (II) or (III)

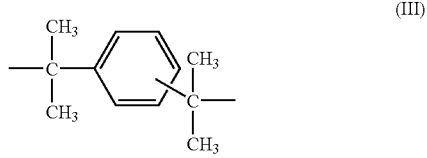

B is in each case $C_1$ to $C_{12}$ alkyl, preferably methyl, halogen, preferably chlorine and/or bromine x each independently of one another is 0, 1 or 2, p is 1 or 0 and $R^5$ and $R^6$ can be selected for each $X^1$ individually and independently of one another signify hydrogen or $C_1$ to $C_6$ alkyl, preferably hydrogen, methyl or ethyl, $X^1$ signifies carbon and m signifies an integer from 4 to 7, preferably 4 or 5, with the proviso that $R^5$ and $R^6$ are simultaneously alkyl on at least one $X^1$ atom.

Preferred diphenols are hydroquinone, resorcinol, dihydroxydiphenols, bis(hydroxyphenyl) $C_1$-$C_5$ alkanes, bis(hydroxyphenyl)$C_5$-$C_6$ cycloalkanes, bis(hydroxyphenyl)ethers, bis(hydroxyphenyl)sulfoxides, bis(hydroxyphenyl)ketones, bis(hydroxyphenyl)sulfones and α,α-bis(hydroxyphenyl)diisopropylbenzenes as well as the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and the di- and tetrabrominated or chlorinated derivatives thereof, such as e.g. 2,2-bis(3-chloro-4-hydroxyphenyl)propane, 2,2-bis(3,5-dichloro-4' hydroxyphenyl)propane or 2,2-bis(3,5-dibromo-4-hydroxyphenyl)propane. 2,2-Bis(4-hydroxyphenyl)propane (bisphenol A) is particularly preferred.

The diphenols can be used individually or as any mixtures. The diphenols are known from the literature or are obtainable by methods known from the literature.

Suitable chain terminators for the production of the thermoplastic, aromatic polycarbonates are e.g. phenol, p-chlorophenol, p-tert.-butylphenol or 2,4 but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols with a total of 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)phenol and 4-(3,5-dimethylheptyl)phenol. The quantity of chain terminators to be used is generally between 0.5 mole % and 10 mole %, based on the molar sum of the diphenols used in each case.

The thermoplastic aromatic polycarbonates can be branched in a known manner, preferably by incorporating 0.05 to 2.0 mole %, based on the sum of diphenols used, of trifunctional or more than trifunctional compounds, e.g. those with three and more phenolic groups.

Both homopolycarbonates and copolycarbonates are suitable. To produce copolycarbonates of component A according to the invention, it is also possible to use 1 to 25 wt. % and preferably 2.5 to 25 wt. %, based on the total quantity of diphenols to be used, of polydiorganosiloxanes with hydroxyaryloxy end groups. These are known (U.S. Pat. No. 3,419,634) and can be produced by methods known from the literature. The production of copolycarbonates comprising polydiorganosiloxanes is described in DE-A 3 334 782.

Preferred polycarbonates besides bisphenol A homopolycarbonates are the copolycarbonates of bisphenol A with up to 15 mole %, based on the molar sums of diphenols, of other diphenols mentioned as preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1.

In the production of polyester carbonates a carbonic acid halide, preferably phosgene, is additionally incorporated as a bifunctional acid derivative.

As chain terminators for the production of the aromatic polyester carbonates, in addition to the above-mentioned monophenols, their chlorocarbonates and the acid chlorides of aromatic monocarboxylic acids, which may optionally be substituted with $C_1$ to $C_{22}$ alkyl groups or halogen atoms, as well as aliphatic $C_2$ to $C_{22}$ monocarboxylic acid chlorides, are also suitable.

The quantity of chain terminators is 0.1 to 10 mole % in each case, based on moles of diphenol in the case of phenolic chain terminators and on moles of dicarboxylic acid dichloride in the case of monocarboxylic acid chloride chain terminators.

The aromatic polyester carbonates can also comprise incorporated aromatic hydroxycarboxylic acids.

The aromatic polyester carbonates can be both linear and branched in a known manner (cf. DE-A 2 940 024 and DE-A 3 007 934).

As branching agents it is possible to use for example trifunctional or polyfunctional carboxylic acid chlorides, such as trimesic acid trichloride, cyanuric chloride, 3,3',4,4-benzophenonetetracarboxylic acid tetrachloride, 1,4,5,8-naphthalenetetracarboxylic acid tetrachloride or pyromellitic acid tetrachloride, in quantities of 0.01 to 1.0 mole % (based on dicarboxylic acid dichlorides used) or trifunctional or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in quantities of 0.01 to 1.0 mole %, based on diphenols used. Phenolic branching agents can be initially charged with the diphenols; acid chloride branching agents can be introduced together with the acid dichlorides.

In the thermoplastic aromatic polyester carbonates, the proportion of carbonate structural units can be varied at will. The proportion of carbonate groups is preferably up to 100 mole %, particularly up to 80 mole % and particularly preferably up to 50 mole %, based on the sum of ester groups and carbonate groups. Both the ester portion and the carbonate portion of the aromatic polyester carbonates can be present in the form of blocks or randomly distributed in the polycondensate.

The relative solution viscosity ($\eta_{rel}$) of the aromatic polycarbonates and polyester carbonates is in the range of 1.20 to 1.30, preferably from 1.22 to 1.28 and particularly preferably from 1.23 to 1.27 (measured on solutions of 0.5 g polycarbonate or polyester carbonate in 100 ml of methylene chloride solution at 25° C.).

Component B

Component B is a rubber-modified component.

Component B.1

Component B comprises as component B.1 a graft polymer or a mixture of several graft polymers, produced by emulsion polymerisation, with particulate rubber as the backbone.

Component B.1 preferably comprises one or more graft polymers of

B.1.1 5 to 95 wt. %, preferably 20 to 80 wt. % and particularly preferably 25 to 60 wt. % (based on the sum of the wt. % of B.1.1 and B.1.2) of at least one vinyl monomer on B.1.2 95 to 5 wt. %, preferably 80 to 20 wt. % and particularly preferably 75 to 40 wt. % (based on the sum of the wt. % of B.1.1 and B.1.2) of one or more backbones having glass transition temperatures of <0° C., preferably <−10° C. and particularly preferably <−20° C.

The backbone B.1.2 preferably has an average particle size ($d_{50}$ value) of from 0.05 to 0.25 μm, preferably from 0.08 to 0.20 and particularly preferably from 0.10 to 0.18 μm.

Monomers B.1.1 are preferably mixtures of

B.1.1.1 50 to 99 wt. %, preferably 60 to 80 wt. % and particularly preferably 70 to 80 wt % (based on the sum of the wt. % of B.1.1.1 and B.1.1.2) of at least one monomer selected from the group consisting of vinyl aromatics and/or ring-substituted vinyl aromatics (such as styrene, α-methylstyrene, p-methylstyrene, p-chlorostyrene) and methacrylic acid ($C_1$-$C_8$) alkyl esters (such as methyl methacrylate, ethyl methacrylate) and B.1.1.2 1 to 50 wt. %, preferably 20 to 40 wt. % and particularly preferably 20 to 30 wt. %
(based on the sum of the wt. % of B.1.1.1 and B.1.1.2) of at least one monomer selected from the group consisting of vinyl cyanides (unsaturated nitriles such as acrylonitrile and methacrylonitrile), (meth)acrylic acid ($C_1$-$C_8$) alkyl esters (such as methyl methacrylate, n-butyl acrylate, t-butyl acrylate), unsaturated carboxylic acids and/or derivatives (such as anhydrides and imides) of unsaturated carboxylic acids (e.g. maleic anhydride and N-phenylmaleimide).

Preferred monomers B.1.1.1 are selected from at least one of the monomers styrene, 0-methylstyrene and methyl methacrylate, and preferred monomers B.1.1.2 are selected from at least one of the monomers acrylonitrile, maleic anhydride and methyl methacrylate. Particularly preferred monomers are B.1.1.1 styrene and B.1.1.2 acrylonitrile.

Suitable backbones B.1.2 for the graft polymers B.1 are for example diene rubbers, EP(D)M rubbers, i.e. those based on ethylene/propylene and optionally diene, acrylate polyurethane, silicone, chloroprene and ethylene/vinyl acetate rubbers as well as silicone acrylate composite rubbers.

Preferred backbones B.1.2 are diene rubbers, e.g. based on butadiene and isoprene, or mixtures of diene rubbers or copolymers of diene rubbers or mixtures thereof with other copolymerisable monomers (e.g. according to B.1.1.1 and B.1.1.2), with the proviso that the glass transition temperature of the component B.1.2 is below <0° C., preferably <−10° C. and particularly preferably <−20° C. Pure polybutadiene rubber is particularly preferred.

Particularly preferred graft polymers B.1 are for example ABS or MBS polymers as described e.g. in DE-OS 2 035 390 U.S. Pat. No. 3,644,574) or in DE-OS 2 248 242 GB-PS 1 409 275), or in Ullmanns, Enzyklopädie der Technischen Chemie, vol. 19 (1980), p. 280 ff.

Particularly suitable graft polymers B.1 have a core-shell structure.

The gel content of the backbone B.1.2 is preferably at least 60 wt. %, particularly preferably at least 80 wt. %, and in particular at least 90 wt % (measured in toluene).

Particularly suitable graft polymers B.1 are in particular also those polymers that have been produced by redox initiation using an initiator system of organic hydroperoxide and ascorbic acid according to U.S. Pat. No. 4,937,285.

Since, as is known, the graft monomers are not necessarily completely grafted on to the backbone during the graft reaction, component B.1 according to the invention is also understood to mean those products that have been obtained by (co)polymerisation of the graft monomers in the presence of the backbone(s) and are jointly formed during the workup. These products can therefore also comprise free (co)polymer of the graft monomers, i.e. not chemically bonded to the rubber, as well as the actual graft polymer.

Suitable acrylate rubbers according to B.1.2 are preferably polymers of acrylic acid alkyl esters, optionally with up to 40 wt. %, based on B.1.2, of other polymerisable, ethylenically unsaturated monomers. The preferred polymerisable acrylic acid esters include $C_1$ to $C_8$ alkyl esters, e.g. methyl, ethyl, butyl, n-octyl and 2-ethylhexyl esters; haloalkyl esters, preferably $C_1$-$C_8$ haloalkyl esters such as chloroethyl acrylate, and mixtures of these monomers.

For crosslinking purposes, monomers with more than one polymerisable double bond can be copolymerised. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzene; but also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine and triallyl benzenes. The quantity of the crosslinked monomers is preferably 0.02 to 5 and particularly preferably 0.05 to 2 wt %, based on the backbone B.1.2. In the case of cyclic crosslinking monomers having at least three ethylenically unsaturated groups, it is advantageous to limit the quantity to less than 1 wt. % of the backbone B.1.2.

Preferred "other" polymerisable, ethylenically unsaturated monomers, which can optionally be used in addition to the acrylic acid esters for the production of the backbone B.1.2, are e.g. acrylonitrile, styrene, α-methylstyrene, acrylamides, vinyl $C_1$-$C_6$ alkyl ethers methyl methacrylate and butadiene. Preferred acrylate rubbers as the backbone 13.1.2 are emulsion polymers having a gel content of at least 60 wt. %.

Other suitable backbones according to B.1.2 are silicone rubbers with graft-linking points, as described in DE-OS 3 704 657, DE-OS 3 704 655, DE-OS 3 631 540 and DE-OS 3 631 539.

The gel content of the backbone B.1.2 is determined at 25° C. in a suitable solvent as the proportion that is insoluble in these solvents (M. Hoffmann, H. Krömer, R. Kuhn, Polymeranalytik I and II, Georg Thieme-Verlag, Stuttgart 1977).

The average particle size $d_{50}$ is the diameter where 50 wt. % of the particles lie above it and 50 wt. % below it. It can be determined by ultracentrifuge measurement (W. Scholtan, H. Lange, Kolloid, Z. und Z. Polymere 250 (1972), 782-796).

Component B.2

Component B in a preferred embodiment additionally comprises as component B.2 a rubber-free vinyl (co)polymer.

The rubber-free vinyl (co)polymers of component B.2 are rubber-free homopolymers and/or copolymers of at least one monomer from the group of the vinyl aromatics, vinyl cyanides (unsaturated nitriles), (meth)acrylic acid ($C_1$ to $C_8$) alkyl esters, unsaturated carboxylic acids and derivatives (such as anhydrides and imides) of unsaturated carboxylic acids.

Particularly suitable are vinyl (co)polymers B.2 of
B.2.1 50 to 99 wt. %, preferably 60 to 80 wt. % and particularly preferably 70 to 80 wt. % (based on the sum of the wt. % of B.2.1 and B.2.2) of at least one monomer selected from the group of the vinyl aromatics (such as e.g. styrene, α-methylstyrene), ring-substituted vinyl aromatics (such as e.g. p-methylstyrene, p-chlorostyrene) and (meth)acrylic acid ($C_1$-$C_8$) alkyl esters (such as e.g. methyl methacrylate, n-butyl acrylate, tert.-butyl acrylate) and
B.2.2 1 to 50 wt. %, preferably 20 to 40 wt. % and particularly preferably 20 to 30 wt. % (based on the sum of the wt. % of B.2.1 and B.2.2) of at least one monomer selected from the group of the vinyl cyanides (such as e.g. unsaturated nitriles such as acrylonitrile and methacrylonitrile), (meth)acrylic acid ($C_1$-$C_8$) alkyl esters (such as e.g. methyl methacrylate, n-butyl acrylate, tert.-butyl acrylate), unsaturated carboxylic acids and derivatives of unsaturated carboxylic acids (e.g. maleic anhydride and N-phenylmaleimide).

The vinyl (co)polymers B.2 are preferably resinous and thermoplastic. The copolymer of B.2.1 styrene and B.2.2 acrylonitrile is particularly preferred.

These vinyl (co)polymers B.2 are known and can be produced by free-radical polymerisation and particularly by emulsion, suspension, solution or bulk polymerisation. The vinyl (co)polymers preferably have weight average molecular weights $M_w$ (determined by GPC with polystyrene as standard) of between 40,000 and 250,000 g mole, preferably between 60,000 and 170,000 g/mole and particularly preferably between 70,000 and 140.000 g/mole.

Components B.1 and B.2 can also be used as a pre-compound of the total quantity or a partial quantity of B.1 with the total quantity or a partial quantity of B.2.

The term pre-compound within the meaning of the invention is to be understood as those mixtures of graft polymers B.1 and rubber-free vinyl (co)polymers B.2 which have been heated in a compounding unit, e.g. a kneader reactor or twin-screw extruder, by the input of thermal and/or mechanical energy to a temperature of 180° C. to 300° C., preferably 200° C. to 280° C. and particularly preferably 220° C. to 260° C., and thus melted, mixed and dispersed in one another, optionally degassed by applying a vacuum and then cooled again and granulated. In a preferred embodiment, the graft polymer B.1 is used in a moist condition (i.e. in the presence of water) according to the processes described in EP 0 768 157 A1 and EP 0 867 463 A1.

The pre-compounds that are suitable for use in component B within the meaning of the invention preferably comprise 10 to 70 parts by weight, particularly preferably 20 to 60 parts by weight and most preferably 30 to 55 parts by weight (based on the pre-compound in each case) of graft polymer B.1 and preferably 30 to 90 parts by weight, particularly preferably 40 to 80 parts by weight and most preferably 45 to 70 parts by weight (based on the pre-compound in each case) of rubber-free vinyl (co)polymer B.2.

Component B.3

Furthermore, component B may optionally also comprise graft polymers B.3 produced in a bulk, solution or bulk-suspension polymerisation process.

The component B.3 preferably comprises graft polymers of

B.3.1 60 to 95 wt. %, preferably 70 to 92 wt. % and particularly preferably 80 to 90 wt. % (based on the sum of the wt. % of B.3.1 and B.3.1) of a mixture of B.3.1 1 65 to 85 wt. % and preferably 70 to 80 wt. % (based on the sum of the wt. % of B.3.1.1 and B.3.1.2) of at least one monomer selected from the group of the vinyl aromatics (such as e.g. styrene, α-methylstyrene), ring-substituted vinyl aromatics (such as e.g. p-methylstyrene, p-chlorostyrene) and methacrylic acid ($C_1$-$C_8$) alkyl esters (such as e.g. methyl methacrylate, ethyl methacrylate) and B.3.1.2 15 to 35 wt. % and preferably 20 to 30 wt. % (based on the sum of the wt. % of B.3.1.1 and B.3.1.2) of at least one monomer selected from the group of the vinyl cyanides (such as e.g. unsaturated nitriles such as acrylonitrile and methacrylonitrile), (meth)acrylic acid ($C_1$-$C_8$) alkyl esters (such as e.g. methyl methacrylate, n-butyl acrylate, tert.-butyl acrylate), unsaturated carboxylic acids and derivatives (such as e.g. anhydrides and imides) of unsaturated carboxylic acids (e.g. maleic anhydride and N-phenylmaleimide)

on

B.3.2 5 to 40 wt. %, preferably 8 to 30 wt. % and particularly preferably 10 to 20 wt. % (based on the sum of the wt. % of 8.3.1 and B.3.2) of at least one backbone having a glass transition temperature of <0° C. and preferably <−20° C.

The graft polymers of component B.3 produced by bulk, solution or bulk-suspension polymerisation preferably have an average particle size ($d_{50}$ value) of from 0.1 to 10 μm, preferably from 0.2 to 5 μm and particularly preferably from 0.3 to 2.0 μm.

Preferred monomers B.3.1.1 are selected from at least one of the monomers styrene, α-methylstyrene and methyl methacrylate, and preferred monomers B.3.1.2 are selected from at least one of the monomers acrylonitrile, maleic anhydride and methyl methacrylate.

Particularly preferred monomers are B.3.1.1 styrene and B.3.1.2 acrylonitrile.

Preferred backbones B.3.2 for the graft polymers 8.3 are e.g. diene rubbers, diene-vinyl block copolymer rubbers, EP(D)M rubbers. i.e. those based on ethylene/propylene and optionally diene and mixtures of more than one of the above-mentioned types of rubber.

Particularly preferred backbones B.3.2 are diene rubbers (e.g. based on butadiene or isoprene), diene-vinyl block copolymer rubbers (e.g. based on butadiene and styrene blocks), copolymers of diene rubbers with other copolymerisable monomers (e.g. according to B.3.1.1 and B.3.1.2) and mixtures of the above-mentioned types of rubber.

Particularly preferred backbones B.3.2 are pure polybutadiene rubber, styrene-butadiene block copolymer rubber and mixtures of pure polybutadiene rubber and styrene-butadiene block copolymer rubber.

Graft polymers B.3 are generally produced by free-radical initiated polymerisation.

Particularly preferred graft polymers B.3 are ABS polymers.

The graft polymer B.3 comprises free copolymer of B.3.1.1 and B.3.1.2, i.e. not chemically bonded to the rubber backbone, which is distinguished by the fact that it can be dissolved in suitable solvents (e.g. acetone).

Component B.3 preferably comprises a free copolymer of B.3.1.1 and B.3.1.2 which has a weight average molecular weight (Mw), determined by gel permeation chromatography with polystyrene as the standard, of from 60,000 to 200,000 g/mole and particularly preferably from 70,000 to 140,000 g/mole.

The quantitative ratios in which components B.1 to B.3 can be contained in the rubber-modified styrene resin of component B are determined on the one hand by the ratio of components A and B in the overall composition and on the other hand by the individual rubber contents of components B.1 and B.3 and the size distribution of their graft particles.

In principle, the quantitative ratios of components A and B on the one hand and components B.1 to B.3 on the other hand in the compositions according to the invention have to be coordinated with one another in such a way that (i) the total rubber content (i.e. the sum of the elastomer portions of B.1 and B.3) of the polycarbonate composition is 1 to 6 wt. %, preferably 2.0 to 5.5 wt. % and particularly preferably 2.5 to 5.0 wt. %, and (ii) at least 40 wt. %, preferably at least 50 wt. % of all the graft particles in component B (i.e. taking into account the graft particles from B.1 and B.3) have a diameter, measured by ultracentrifuge, of up to 200 nm, and (iii) in a preferred embodiment, moreover, up to 25 wt. %, in particular up to 20 wt. % of all the graft particles in component B have a diameter, measured by ultracentrifuge, of over 400 nm.

In a preferred embodiment, with the proviso that the aforementioned conditions (i) to (iii) are fulfilled, component B consists of 5 to 50 wt. %, particularly preferably 8 to 40 wt. % and most preferably 15 to 35 wt. %, based on component B, of component B.1, 50 to 95 wt. %, particularly preferably 60 to 92 wt. % and most preferably 65 to 85 wt. %, based on component B, of component B.2 and 0 to 25 wt. %, particularly preferably 0 to 10 wt. % and most preferably 0 wt. %, based on component B, of component B.3.

Component C

The composition can comprise polymer additives as component C. Suitable commercial polymer additives according to component C are additives such as e.g. flame retardants (e.g. phosphorus or halogen compounds), flame retardant synergists (e.g. nanoscale metal oxides), smoke-inhibiting additives (e.g. boric acid or borates), anti-dripping agents (e.g. compounds from the classes of substances of the fluorinated polyolefins, silicones and aramid fibres) internal and external lubricants and mould release agents (e.g. pentaerythritol tetrastearate, montan wax or polyethylene wax), flow auxiliaries (e.g. low molecular weight vinyl (co)polymers), antistatic agents (e.g. block copolymers of ethylene oxide and propylene oxide, other polyethers or polyhydroxy ethers, polyether amides, polyester amides or sulfonic acid salts), conductivity additives (e.g. conductive carbon black or carbon nanotubes), stabilisers (e.g. UV/light stabilisers, heat stabilisers, antioxidants, transesterification inhibitors, antihydrolysis agents), antibacterial additives (e.g. silver or silver salts), scratch resistance improving additives (e.g. silicone oils or hard fillers such as ceramic (hollow) spheres), IR absorbers, optical brighteners, fluorescent additives, fillers and reinforcing materials (e.g. talc, optionally ground glass or carbon fibres, glass or ceramic (hollow) spheres, mica, kaolin, $CaCO_3$ and glass flakes) as well as dyes and pigments (e.g. carbon black, titanium dioxide or iron oxide) and Brönsted acid compounds as base scavengers, or mixtures of more than one of the above additives.

In a preferred embodiment, the compositions according to the invention are free from flame retardants and free from fillers and reinforcing materials.

Production of Moulding Compositions and Mouldings

The thermoplastic moulding compositions according to the invention can be produced for example by mixing the respective components in a known manner and melt-compounding and melt-extruding them at temperatures of preferably 220° C. to 330° C. and particularly preferably at 260 to 300° C. in conventional units such as internal mixers, extruders and twin in screw extruders. The mixing of the individual components can take place in a known manner, either consecutively or simultaneously and either at about 20° C. (room temperature) or at a higher temperature.

The invention therefore also provides a process for the production of the compositions according to the invention.

The moulding compositions according to the invention can be used for the production of mouldings of any type. These can be produced for example by injection moulding, extrusion and blow-moulding processes. Another form of processing is the production of mouldings by thermoforming from previously produced sheets or films.

Examples of these mouldings are films, profiles, housing parts of any type, e.g. for domestic appliances such as juice presses, coffee machines, mixers; for office equipment such as monitors, flat screens, notebooks, printers, copiers; sheets, tubes, electrical installation ducts, windows, doors and other profiles for the building sector (interior fittings and exterior applications) as well as electrical and electronic parts such as switches, plugs and sockets and components for commercial vehicles, particularly for the car sector.

The moulding compositions according to the invention are also suitable for example for the production of the following mouldings: interior fittings for rail vehicles, ships, aircraft, buses and other motor vehicles, body parts for motor vehicles, housings for electrical equipment comprising small transformers, housings for equipment for information processing and transfer, housings and claddings for medical equipment, massage equipment and housings therefor, toy vehicles for children, flat wall panels, housings for safety devices, thermally insulated transport containers, mouldings for sanitaryware and bathroom fittings, covering grid plates for ventilation openings and housings for garden equipment.

In particular, the moulding compositions according to the invention are suitable for the production of metallised mouldings, and in a preferred embodiment also mouldings with a surface which is at least partly curved concavely or convexly on the metallised side, with high requirements in terms of surface gloss, particularly with high requirements in terms of the homogeneity of the surface gloss, and with high requirements in terms of heat resistance and toughness. These mouldings made of the moulding compositions according to the invention can be welded to mouldings of polycarbonate and/or polymethyl methacrylate.

In a particularly preferred embodiment, the moulding compositions according to the invention are thus suitable for the production of lamp housings with a reflector functionality, which are optionally to be welded to a transparent lamp cover made of polycarbonate or polymethyl methacrylate. For example and preferably, the moulding compositions according to the invention are therefore suitable for the production of car headlights and car rear lights.

For the metallising of the injection-moulded parts, in principle all processes known from the prior art are suitable. For example ECD (electro-coating deposition) or galvanising, PVD (physical vapour deposition and CVD (chemical vapour deposition) processes may be mentioned here.

The injection-moulded parts are preferably suitable for metallising by a PVD process, such as for example electron beam vapour deposition or the sputtering process.

Examples

A)

Component A-1

Linear polycarbonate based on bisphenol A having a relative solution viscosity (measured on a solution of 0.5 g of the polycarbonate in 100 ml of methylene chloride solution at 25° C.) of 1.25.

Component B.1-1

ABS graft polymer with a core-shell structure produced by emulsion polymerisation with 46 wt. % of a shell of styrene-acrylonitrile copolymer with a ratio of styrene to acrylonitrile of 77:23 wt.% on 54 wt.% of a particulate backbone, wherein the graft particles, i.e. the particulate rubber backbone with its chemically bonded graft shell, have an average particle size $d_{50}$ of about 150 nm and wherein the backbone consists of pure polybutadiene rubber. 55 wt. % of the graft particles have a diameter, measured by ultracentrifuge, of less than 200 nm and 15 wt. % of the graft particles have a diameter, measured by ultracentrifuge, of more than 400 nm.

Component B.2-1

SAN polymer of 23 wt. % acrylonitrile and 77 wt. % styrene.

Component B-1

Pre-compound consisting of 50 wt. % of component B.1-1 and 50 wt. % of component B.2-1.

Component C-1

Pentaerythritol tetrastearate as mould release agent

Component C-2

Phosphite ester of bis(2-hydroxy-3-cyclohexyl-5-methylphenyl)methane according to the following formula (V)

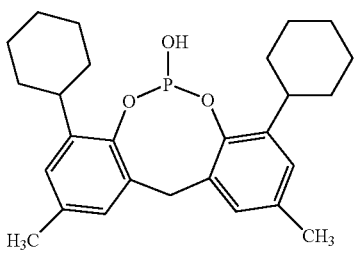

(V)

Using a ZSK-25 twin screw extruder (Coperion, Werner & Pfleiderer) the following composition was compounded at a melt temperature of 260° C.:

| | |
|---|---|
| A-1 | 65.46% |
| B-1 | 14.00% |
| B.2-1 | 19.70% |
| C-1 | 0.74% |
| C-2 | 0.10% |

The composition has an elastomer content of 3.8 wt. %.

A melt viscosity of 190 Pas was measured on the composition in accordance with ISO 11443 at a temperature of 260° C. and a shear rate of 1000 $s^{-1}$.

As a measure of the high heat resistance, a Vicat B120 value of 126° C. was determined in accordance with ISO 306.

In a notched impact test at 23° C. in accordance with ISO 180/1A, the material displayed tough fracture behaviour. A notched impact strength value of 40 $kJ/m^2$ was determined.

Mouldings with a partly concave or convex shaped surface, which were produced from this composition according to the invention by an injection-moulding process, displayed high gloss after metallising by means of PVD (physical vapour deposition) when evaluated visually, the homogeneity of the gloss over the moulding being higher than in comparable mouldings shaped from compositions according to the prior art.

B)

Component A-1

Linear polycarbonate based on bisphenol A having a relative solution viscosity (measured on a solution of 0.5 g of the polycarbonate in 100 ml of methylene chloride solution at 25'C) of 1.25.

Component A-2

Linear polycarbonate based on bisphenol A having a relative solution viscosity (measured on a solution of 0.5 g of the polycarbonate in 100 ml of methylene chloride solution at 25° C.) of 1.28.

Component B-1a to B-7a

Components B-1 a to B-7a are ABS polymers containing emulsion polymerized ABS graft polymer, which were produced by blending emulsion polymerized ABS, styrene-acrylonitrile copolymer and mass polymerized ABS in variable contents. The composition of monomers of ABS polymers was determined by infrared spectroscopy and the graft particle size distribution was measured by untracentrifugation (Table 1).

TABLE 1

Composition of monomers and graft particle size distribution of ABS-Polymers B-1a to B-7a

| | Acrylonitrile [wt.-%] | Butadiene [wt.-%] | Styrene [wt.-%] | graft particle content <200 nm [wt.-%] | graft particle content >400 nm [wt.-%] |
|---|---|---|---|---|---|
| B-1a | 22 | 11 | 67 | 65 | 10 |
| B-2a | 25 | 2 | 73 | 65 | 10 |
| B-3a | 19 | 26 | 55 | 65 | 10 |
| B-4a | 22 | 11 | 67 | 70 | 20 |
| B-5a | 22 | 11 | 67 | 52 | 36 |
| B-6a | 22 | 11 | 67 | 53 | 18 |
| B-7a | 21 | 18 | 61 | 54 | 22 |

Component C-1

Pentaerythritol tetrastearate as mould release agent

Component C-2

Phosphite ester of bis(2-hydroxy-3-cyclohexyl-5-methylphenyl)methane according to the following formula (V)

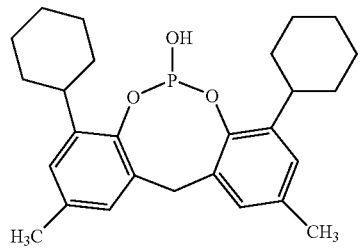

(V)

Component C-3

Carbon black as pigment

Preparation and Testing of the Moulding Compositions

The substances listed in Table 2 are compounded at a speed of 225 rpm and with a throughput of 20 kg/h, at a melt temperature of 260° C. on a twin-screw extruder (ZSK-25) (Werner und Pfleiderer) and then granulated.

The melt viscosity of the compounds was measured at 260° C. and with a shear rate of 1000 $s^{-1}$ in accordance with ISO 11443.

To distinguish the differences of the present compositions an injection molding die was chosen to produce an article with a curved surface, sharp-edged bows, apertures, weld lines etc. which brings out inhomogeneities in degree of gloss (clouding).

The granules of the different compositions were dried at 110° C. for 4 h in an convection drier. The moulded articles were produced from the dried granules on an injection moulding machine, Krauss-Maffei KM 350 model, at a melting temperature of 280° C. a die temperature of 85° C. and an injection rate of 40 mm/s).

The mouldings were coated with an aluminum layer having a thickness of 150 nm by electron beam evaporation und immediately visually evaluated to minimize the influence of oxidation processes with respect to the optical properties of the coated moulded article.

The degree of gloss and the resulting reflectivity of the metallized molded articles were evaluated (rating "+" equates best gloss/reflectivity; rating "−" equates significant lower gloss/reflectivity). Moreover homogeneity of degree of gloss in view of "clouding" was evaluated (rating "+" equates high homogeneity of gloss/low "clouding"; rating "−" equates significant lower homogeneity of gloss/high "clouding")

TABLE 2

| | \multicolumn{7}{c}{Examples} | | | | | | |
|---|---|---|---|---|---|---|---|
| | 1 | V2 | V3 | 4 | 5 | 6 | V7 |
| Composition | | | | | | | |
| A-1 | 65.46 | 65.46 | 65.46 | 65.46 | 65.46 | 65.46 | — |
| A-2 | — | — | — | — | — | — | 60.56 |
| B-1a | 33.7 | — | — | — | — | — | — |
| B-2a | — | 33.7 | — | — | — | — | — |
| B-3a | — | — | 33.7 | — | — | — | — |
| B-4a | — | — | — | 33.7 | — | — | — |
| B-5a | — | — | — | — | 33.7 | — | — |
| B-6a | — | — | — | — | — | 33.7 | — |
| B-7a | — | — | — | — | — | — | 38.6 |
| C-1 | 0.74 | 0.74 | 0.74 | 0.74 | 0.74 | 0.74 | 0.74 |
| C-2 | 0.10 | 0.10 | 0.10 | 0.10 | 0.10 | 0.10 | 0.10 |
| C-3 | 0.30 | 0.30 | 0.30 | 0.30 | 0.30 | 0.30 | 0.30 |
| Polybutadien-content [wt.-%] | 3.6 | 0.8 | 8.8 | 3.6 | 3.6 | 3.6 | 6.9 |
| grafted particle content <200 nm [wt.-%] | 65 | 65 | 65 | 70 | 52 | 53 | 54 |
| grafted particle content >400 nm [wt.-%] | 10 | 10 | 10 | 20 | 36 | 18 | 22 |
| Composition Properties | | | | | | | |
| melt viscosity [Pas] | 203 | 184 | 261 | 198 | 195 | 201 | 205 |
| Metallized Article Properties | | | | | | | |
| surface gloss (degree of gloss) | + | − | − | + | − | + | − |
| homogeneity of surface gloss | + | − | − | + | + | + | − |

The Examples in Table 2 show that only the metallized molded articles according to the compositions of the present invention have both a high degree of gloss and accordingly high reflectivity and high homogeneity of gloss, i.e. low clouding.

If compositions with a rubber content outside of the claimed range of 1 to 6 wt.-% are used, the metallized articles have both lower gloss and lower homogeneity of gloss (cf. Examples 1, V1 and V3).

Moreover, if the content of graft particles (component B) with a diameter >400 nm exceeds 25 wt.-% high homogeneity of gloss may be obtained, however degree of gloss and reflectivity deteriorate (cf. Examples 5 and 6).

The invention claimed is:

1. A polycarbonate composition consisting of
   A) 63 to 80 parts by weight (based on the sum of the parts by weight of components A, B and C) of aromatic polycarbonate and/or aromatic polyester carbonate with a relative solution viscosity, measured in methylene chloride, of 1.20 to 1.30,
   B) 15 to 37 parts by weight (based on the sum of the parts by weight of components A, B and C) of rubber-modified component comprising
      B.1) at least one graft polymer, produced by emulsion polymerisation, by graft polymerisation of
         B.1.1) 5 to 95 wt. %, based on the sum of B.1.1 and B.1.2, of at least one vinyl monomer on
         B.1.2) 95 to 5 wt. %, based on the sum of B.1.1 and B.1.2, of one or more particulate rubbers as backbones with glass transition temperatures of <0° C.,
      B.2) optionally a rubber-free vinyl (co)polymer,
      B.3) optionally a graft polymer of at least one vinyl monomer on at least one rubber backbone with a glass transition temperature of <0° C., produced by a bulk, solution or bulk-suspension polymerisation process,
      wherein the graft polymers B.1 and B.3, in addition to graft particles, may optionally also comprise as a result of their production free (co)polymer of the vinyl monomers, that are not chemically bonded to the rubber particles and/or included in the graft particles in a form that is insoluble in organic solvents,
   C) 0.1 to 5 parts by weight (based on the sum of the parts by weight of components A, B and C) of at least one additive selected from the group consisting of pentaerythritol tetrastearate, montan wax, polyethylene wax, flow auxiliaries, block copolymers of ethylene oxide and propylene oxide, polyethers, polyhydroxy ethers, polyether amides, polyester amides, sulfonic acid salts, antibacterial additives, silicone oils, hard fillers, glass or ceramic (hollow) spheres, optionally ground glass, carbon fibres, mica, kaolin, $CaCO_3$, glass flakes, IR absorbers, optical brighteners, fluorescent additives, dyes, pigments, and Brönsted acid compounds,
   wherein
   (i) the rubber content of the polycarbonate composition is 1 to 6 wt. %, and
   (ii) at least 50 wt. % of the graft particles in component B have a diameter (measured by ultracentrifuge) below 200 nm, and wherein no more than 25 wt. % of the graft particles in component B have a diameter (measured by ultracentrifuge) of over 400 nm.

2. A composition according to claim 1 with a rubber content of the polycarbonate composition of 2.5 to 5.0 wt. %.

3. A composition according to claim 1 consisting of
   A) 65-75 parts by weight (based on the sum of the parts by weight of components A, B and C) of aromatic polycarbonate and/or aromatic polyester carbonate with a relative solution viscosity, measured in methylene chloride, of 1.20 to 1.30,
   B) 20-34.9 parts by weight (based on the sum of the parts by weight of components A, B and C) of rubber-modified component comprising
      B.1) at least one graft polymer, produced by emulsion polymerisation, by graft polymerisation of
         B.1.1) 5 to 95 wt. %, based on the sum of B.1.1 and B.1.2, of at least one vinyl monomer on
         B.1.2) 95 to 5 wt. %, based on the sum of B.1.1 and B.1.2, of one or more particulate rubbers as backbones with glass transition temperatures of <0° C., B.2) optionally a rubber-free vinyl (co)polymer,
B.3) optionally a graft polymer of at least one vinyl monomer on at least one rubber backbone with a glass transition temperature of <0° C., produced by a bulk, solution or bulk-suspension polymerisation process, wherein the graft polymers B.1 and B.3, in addition to graft particles, may optionally also comprise as a result of their production free (co)polymer of the vinyl monomers, that are not chemically bonded to the rubber particles and/or included in the graft particles in a form that is insoluble in organic solvents,
C) 0.1 to 5 parts by weight (based on the sum of the parts by weight of components A, B and C) of at least one additive selected from the group consisting of pentaerythritol tetrastearate, montan wax, polyethylene wax, flow auxiliaries, block copolymers of ethylene oxide and propylene oxide, polyethers, polyhydroxy ethers, polyether amides, polyester amides, sulfonic acid salts, antibacterial additives, silicone oils, hard fillers, glass or ceramic (hollow) spheres, optionally ground glass, carbon fibres, mica, kaolin, $CaCO_3$, glass flakes, IR absorbers, optical brighteners, fluorescent additives, dyes, pigments, and Brönsted acid compounds.

4. A composition according to claim 3, wherein at least 50 wt. % of the graft particles in component B have a diameter (measured by ultracentrifuge) below 200 nm.

5. A composition according to claim 4, wherein no more than 25 wt. % of the graft particles in component B have a diameter (measured by ultracentrifuge) of over 400 nm.

6. A composition according to claim 1 in which component A has a relative solution viscosity, measured in methylene chloride, of 1.23 to 1.27.

7. A polycarbonate composition consisting of
A) 55 to 90 parts by weight (based on the sum of the parts by weight of components A, B and C) of aromatic polycarbonate and/or aromatic polyester carbonate with a relative solution viscosity, measured in methylene chloride, of 1.20 to 1.30,
B) 10 to 45 parts by weight (based on the sum of the parts by weight of components A, B and C) of rubber-modified component comprising
B.1) at least one graft polymer, produced by emulsion polymerisation, by graft polymerisation of
B.1.1) 5 to 95 wt. %, based on the sum of B.1.1 and B.1.2, of at least one vinyl monomer on
B.1.2) 95 to 5 wt. %, based on the sum of B.1.1 and B.1.2, of one or more particulate rubbers as backbones with glass transition temperatures of <0° C.,
B.2) optionally a rubber-free vinyl (co)polymer,
B.3) optionally a graft polymer of at least one vinyl monomer on at least one rubber backbone with a glass transition temperature of <0° C., produced by a bulk, solution or bulk-suspension polymerisation process, wherein the graft polymers B.1 and B.3, in addition to graft particles, may optionally also comprise as a result of their production free (co)polymer of the vinyl monomers, that are not chemically bonded to the rubber particles and/or included in the graft particles in a form that is insoluble in organic solvents,
wherein at least 50 wt. % of the graft particles in component B have a diameter (measured by ultracentrifuge) below 200 nm., and
wherein no more than 25 wt. % of the graft particles in component B have a diameter (measured by ultracentrifuge) of over 400 nm;
C) 0.1 to 5 parts by weight (based on the sum of the parts by weight of components A, B and C) of at least one additive selected from the group consisting of pentaerythritol tetrastearate, montan wax, polyethylene wax, flow auxiliaries, block copolymers of ethylene oxide and propylene oxide, polyethers, polyhydroxy ethers, polyether amides, polyester amides, sulfonic acid salts, antibacterial additives,-silicone oils, hard fillers, glass or ceramic (hollow) spheres, optionally ground glass, carbon fibres, mica, kaolin, $CaCO_3$, glass flakes, IR absorbers, optical brighteners, fluorescent additives, dyes, pigments, and Brönsted acid compounds,
wherein
the rubber content of the polycarbonate composition is 1 to 6 wt. %.

8. A composition according to claim 7 comprising 63 to 80 parts by weight (based on the sum of the parts by weight of components A, B and C) of component A.

9. A composition according to claim 7 comprising 65 to 75 parts by weight (based on the sum of the parts by weight of components A, B and C) of component A.

10. A composition according to claim 1, wherein component B.1 is a graft polymer of
B.1.1) 25 to 60 wt. % (based on the sum of the wt. % of B.1.1 and B.1.2) of a mixture of
B.1.1.1) 50 to 99 wt. % (based on the sum of the wt. % of B.1.1.1 and B.1.1.2) of at least one monomer selected from the group consisting of vinyl aromatics and/or ring-substituted vinyl aromatics and methacrylic acid ($C_1$-$C_8$) alkyl esters and
B.1.1.2) 1 to 50 wt. % (based on the sum of the wt. % of B.1.1.1 and B.1.1.2) of at least one monomer selected from the group consisting of vinyl cyanides, (meth) acrylic acid ($C_1$-$C_8$) alkyl esters, unsaturated carboxylic acids and/or derivatives of unsaturated carboxylic acids
on
B.1.2) 75 to 40 wt. % (based on the sum of the wt. % of B.1.1 and B.1.2) of one or more backbones with glass transition temperatures of <−20° C.

11. A composition according to claim 10, wherein component B.1 is an ABS or MBS graft polymer with a core-shell structure.

12. A composition according to claim 1, which is free from component B.3.

13. A component produced from or comprising a composition according to claim 1.

14. A metallised moulding with a surface which is at least partly curved concavely or convexly on a metallised side thereof which is produced from a composition of claim 1.

15. A composition according to claim 1, which has a melt viscosity of not more than 230 Pas, measured in accordance with ISO 1143 at a melt temperature of 260° C. and a shear rate of 1000 $s^{-1}$, and which is capable for the production of a metallised moulding having a surface which is at least partly curved concavely or convexly on a metallised side thereof.

16. A lamp housing with a reflector functionality comprising a composition according to claim 1.

17. A composition according to claim 1, wherein 10 to 25 wt. % of the graft particles in component B have a diameter (measured by ultracentrifuge) of over 400 nm.

18. A composition according to claim 1, wherein component B.2 is present and is a rubber-free vinyl (co)polymer of
B.2.1 50 to 99 wt. % (based on the sum of the wt. % of B.2.1 and B.2.2) of at least one monomer selected from the group of the vinyl aromatics, ring substituted vinyl aromatics, and (meth)acrylic acid ($C_1$-$C_8$) alkyl esters and B.2.2 1 to 50 wt. % (based on the sum of the wt. % of B.2.1 and B.2.2) of at least one monomer selected from the group of the vinyl cyanides, (meth)acrylic acid ($C_1$-$C_8$) alkyl esters, unsaturated carboxylic acids and derivatives of unsaturated carboxylic acids.

19. A composition according to claim 1, wherein component B.3 is present and is a graft polymer of B.3.1 60 to 95 wt. % (based on the sum of the wt. % of B.3.1 and B.3.2) of a mixture of B.3.1.1 65 to 85 wt. % (based on the sum of the wt. % of B.3.1.1 and B.3.1.2) of at least one monomer selected from the group of the vinyl aromatics, ring-substituted vinyl aromatics, and methacrylic acid ($C_1$-$C_8$) alkyl esters and B.3.1.2 15 to 35 wt. % (based on the sum of the wt. % of B.3.1.1 and B.3.1.2) of at least one monomer selected from the group of the vinyl cyanides, (meth)acrylic acid ($C_1$-$C_8$) alkyl esters, unsaturated carboxylic acids and derivatives of unsaturated carboxylic acids on B.3.2 5 to 40 wt. % (based on the sum of the wt. % of B.3.1 and B.3.2) of at least one backbone having a glass transition temperature of <0° C.

* * * * *